Figure 1:
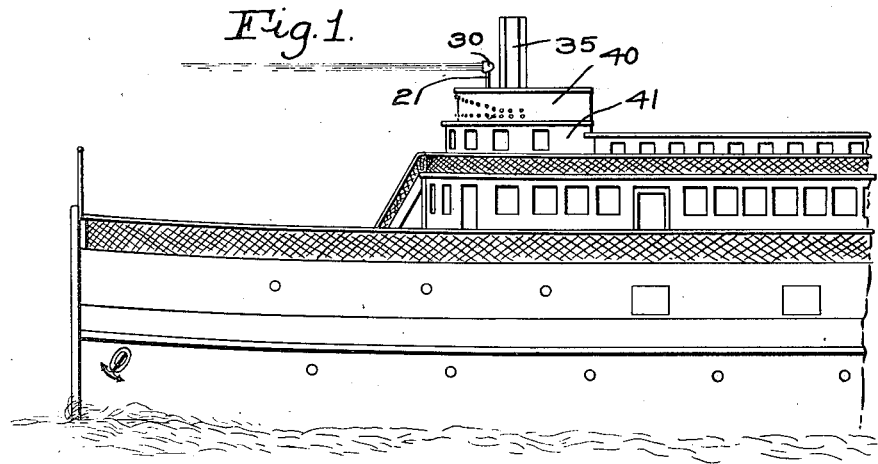

P. W. FULLER.
APPARATUS FOR DETERMINING DISTANCE AND DIRECTION.
APPLICATION FILED APR. 4, 1907. RENEWED DEC. 15, 1914.

1,149,122.

Patented Aug. 3, 1915.
3 SHEETS—SHEET 1.

Witnesses
W. C. Lunsford
Joseph M. Ward

Inventor
Percy W. Fuller.
By Kerosky & Guy
Attys.

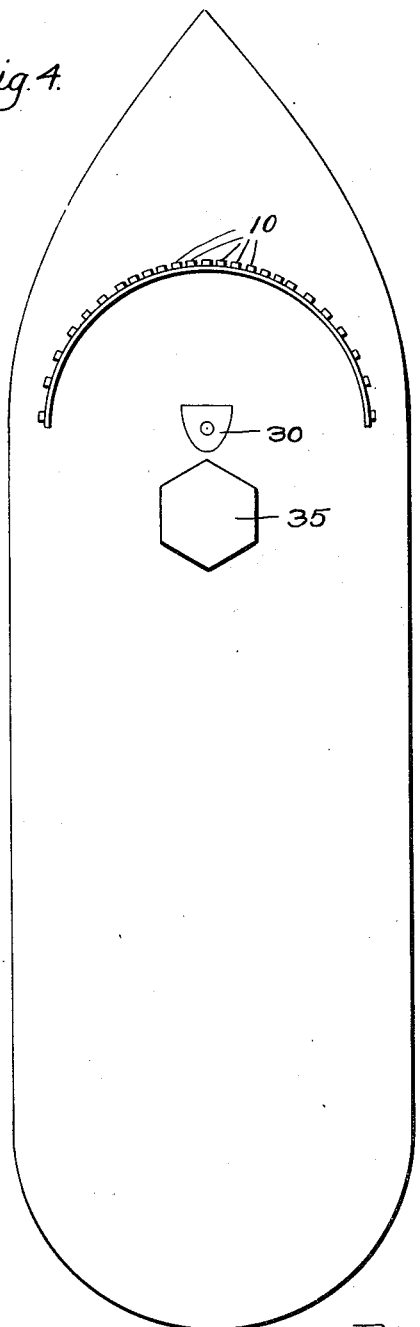

P. W. FULLER.
APPARATUS FOR DETERMINING DISTANCE AND DIRECTION.
APPLICATION FILED APR. 4, 1907. RENEWED DEC. 15, 1914.
1,149,122.
Patented Aug. 3, 1915.
3 SHEETS—SHEET 3.
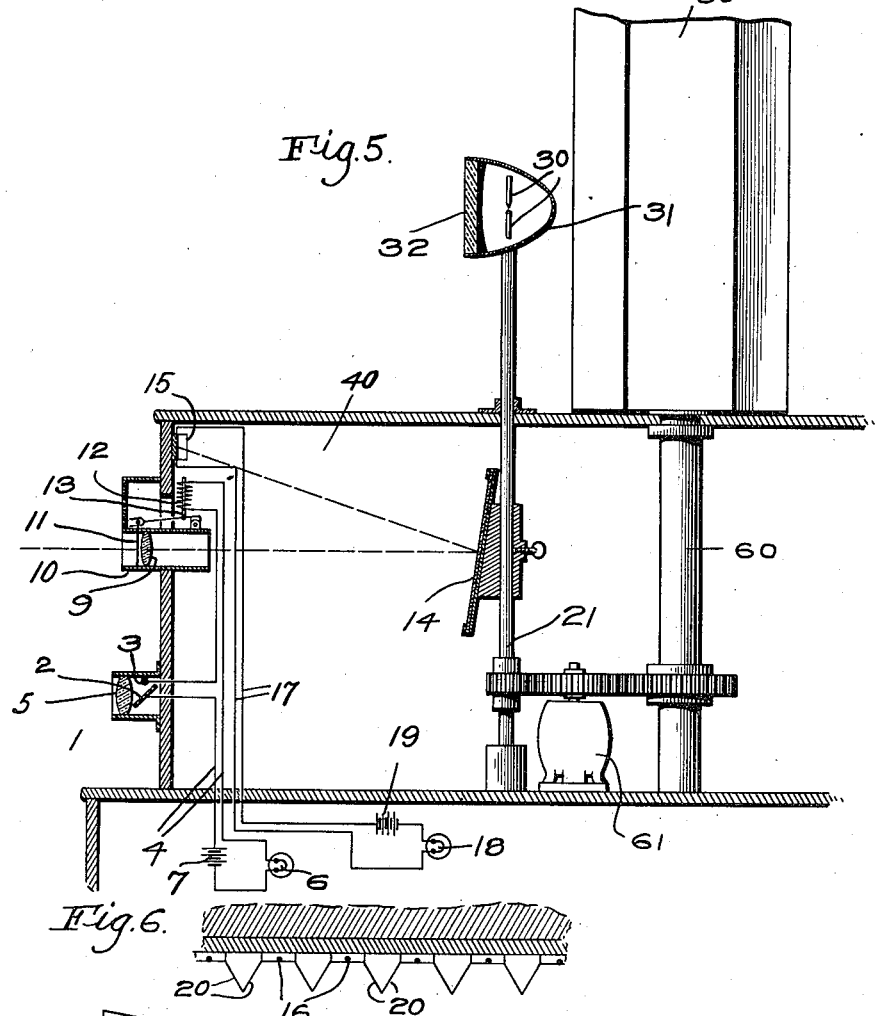
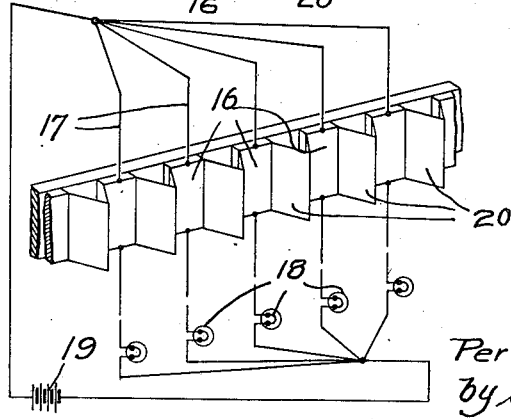
Witnesses
W. C. Lunsford.
Joseph M. Ward.
Inventor
Percy W. Fuller.
by Crosby & Gregory
att'ys.

UNITED STATES PATENT OFFICE.

PERCY W. FULLER, OF BOSTON, MASSACHUSETTS, ASSIGNOR OF ONE-HALF TO AUGUST BERNARD PRAETSCH, OF BOSTON, MASSACHUSETTS.

APPARATUS FOR DETERMINING DISTANCE AND DIRECTION.

1,149,122.     Specification of Letters Patent.     Patented Aug. 3, 1915.

Application filed April 4, 1907, Serial No. 366,372. Renewed December 15, 1914. Serial No. 877,447.

*To all whom it may concern:*

Be it known that I, PERCY W. FULLER, a citizen of the United States, and a resident of Boston, in the county of Suffolk and State of Massachusetts, have invented an Improvement in Apparatus for Determining Distance and Direction, of which the following description, in connection with the accompanying drawing, is a specification, like letters on the drawing representing like parts.

This invention has for its object to provide a device by which both the distance and the direction of an object can be visually indicated.

The invention is especially useful in enabling a ship at sea to determine both the distance and direction of another ship although it may be used for enabling a ship to determine the distance and direction of a lighthouse or any other object on the shore, and may also be used on land to aid in determining distance and direction of objects.

The invention is such that it can be used either in daylight or at night, and it is not interfered with to any great extent by fog, clouds, smoke or vapor.

In carrying out my invention I propose to make use of energy which is transmitted by transverse waves, by which I mean waves that have a movement transverse to the direction in which the energy is propagated. As familiar examples of energy of this class I would refer to light and electricity.

While my invention broadly has for its object to provide a system of signaling for determining both the distance and direction of an object, which system is made operative by means of energy thus transmitted in the form of transverse waves, yet in order to explain the invention I have chosen herein to illustrate an apparatus specially designed to be operated by light rays and particularly ultra-violet rays although the invention is not necessarily confined to the use of these rays. A signal system adapted to be operated by the use of these ultra-violet rays has the advantage that it will not become disarranged by waves of electricity, nor will the use of it disarrange or interfere with wireless telegraph messages.

One embodiment of my invention will first be described and then the novel features thereof pointed out in the appended claims.

Figure 2:
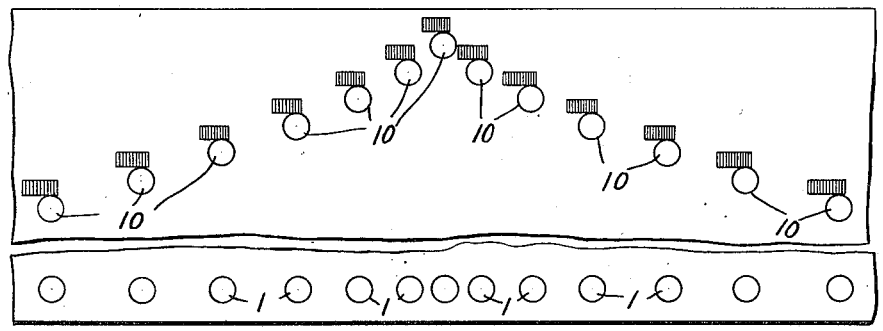
Figure 3:
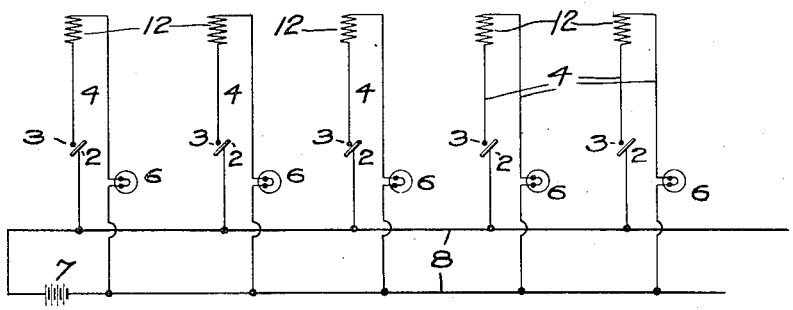

In the drawings Figure 1 is a view of a boat showing one way in which it might be equipped with my signal apparatus; Fig. 2 is a detail view showing the arrangement of receivers for both the direction-indicating means and the distance-indicating means; Fig. 3 is a detail showing the circuits for the direction indicating means; Fig. 4 is a diagram view of a boat showing how my apparatus may be applied thereto; Fig. 5 is a sectional detail showing the distance indicating means and direction-indicating means; Figs. 6 and 7 are detail views of the distance-indicating means.

For indicating the direction of a distant object, I provide in this embodiment of my invention a plurality of receivers 1, each arranged to receive ultra-violet light rays or energy in some other form from a particular direction. If the apparatus is used on a boat these receivers would preferably be arranged in the arc of a circle, as shown in Fig. 4, a sufficient number of them being used to cover substantially a semi-circle.

Each receiver is in the form of a hermetically-sealed partially-exhausted glass chamber within which are two terminals 2 and 3 that are connected to a circuit 4 having a lamp 6 therein. The terminal 2 is in the form of a plate set at an angle of 45° to the ultra violet rays thrown upon it, and the terminal 3 is in the nature of a point. This chamber has at one end a lens 5 of some material which will readily permit the passage of the ultra-violet rays (quartz being a good material for this purpose), and which is arranged to focus the beam of light rays on the plate 2.

The potential at the terminals 2, 3, is not sufficient to cause the current to jump the gap between the terminals under normal conditions, and, therefore, normally the circuit 4 is broken and the lamp 6 therein will not be lighted.

It is a demonstrated fact that when the terminals, such as 2, 3, of a circuit are arranged in a hermetically-sealed chamber the resistance between said terminals is reduced by focusing ultra-violet rays on the terminal 2, and if the normal potential of the circuit has the proper relation to the normal resistance between the terminals, the focusing of ultra-violet rays on the terminal 2 will result in reducing the resistance between the terminals sufficiently so that the potential at said terminals is sufficient to cause the current to jump from one to the other, thus practically closing the circuit 4 and establishing a current therein.

I make use of this principle in the present embodiment of my invention and maintain such a potential in the circuit 4 at the terminals 2, 3, that whenever ultra-violet rays are transmitted through the lens 5 and are focused on the terminal 2, the resistance between said terminals is reduced sufficiently to permit the current to flow, thereby in effect closing the normally-open circuit 4. As soon as this occurs, the lamp 6 in said circuit will become lighted, as will be obvious.

It will be understood that in practice I propose to employ a plurality of these receivers and a circuit 4 with a lamp 6 therein for each of the receivers, so that there will be as many circuits 4 and as many lamps 6 as there are receivers 1, each circuit 4 having its terminals 2, 3, as above described. All of these circuits may be supplied with current from a common source of electrical energy 7, as seen in Fig. 3, and for this purpose may readily be connected in parallel to the main circuit 8. With this construction it will be obvious that if the receivers are arranged in the arc of a circle, as shown in Fig. 4, and ultra-violet rays are emanating from a distant object, some of the rays will pass into the particular receiver 1 which is directed toward the object and the corresponding circuit 4 will be closed thereby causing the corresponding lamp 6 to glow. Therefore, by merely observing which one of the various lamps 6 is lighted, the direction of the object can be readily determined.

For determining the distance of the object I have provided a distance-indicating means sensitive to the waves projected from said object and adapted to visually indicate the distance of the object from the indicating means. In the present embodiment of my invention this distance-indicating means comprises a plurality of lenses 9, one for each of the receivers 1, which lenses are of a material, such as quartz, which will freely transmit the ultra-violet rays. These lenses 9 are herein shown as situated in holders 10 which are situated directly over the receivers 1, and said lenses and their holders constitute receivers for the distance-indicating means. Each lens is normally screened by a shutter 11, and means are provided for removing this shutter from in front of any lens when the ultra-violet rays pass into the corresponding receiver 1. For this purpose each circuit 4 has therein the coils of a solenoid 12, the core 13 of which is connected to the shutter for the corresponding lens 9 so that whenever any circuit 4 is closed the solenoid will be energized thereby lifting its core and opening the shutter 11 of the corresponding lens 9.

Situated back of the lenses 9 is a mirror or reflector 14 which is adapted to reflect the ultra-violet rays that pass through any lens 9 when the shutter is open on to an indicator designated generally by 15 which is arranged to indicate visually the distance of the distant object. This indicator is made up of a plurality of selenium cells 16, each of which is in a circuit 17 that has a lamp 18 therein. These circuits 17 may be supplied with current in any suitable way, and may conveniently be connected to a common source of electrical energy 19, as shown in Fig. 7.

The resistance of the selenium cells is such that no current will flow in any of the circuits 17 under normal conditions, and, therefore, none of the lamps 18 are normally lighted. These selenium cells are preferably arranged side by side, or in a row, and situated between adjacent cells is some fluorescent substance 20 which is adapted to be illuminated when struck by ultra-violet or other light rays.

The mirror 14 is mounted to revolve very rapidly, say thirty thousand times a minute, and for this purpose I have shown it as mounted on a shaft 21, which may be driven at this speed.

The indicator 15 is situated above the lens 9, and the mirror 14 is given an inclination, as shown in Fig. 5, so that it will reflect the rays transmitted through the lens 9 on to said indicator, as shown by dotted lines in Fig. 5.

Assuming that the shutter 11 for one of the lenses 9 is open, any ultra-violet rays which are transmitted through said lens will strike the mirror 14 as it revolves and be reflected thereby on to the indicator 15, and when said rays strike the fluorescent substance 20 between any selenium cells said fluorescent substance becomes illuminated, and by lighting up the adjacent selenium cell reduces the resistance in the corresponding circuit sufficiently to permit current enough to flow to light the corresponding lamp 18.

The present embodiment of the invention shows an arrangement by which the ultra-violet rays which are projected from said object are used in determining the direction of the object from the indicating means, while the ultra-violet rays which are originally produced at the station where the observer is and are projected on said distant object and then reflected from said object back to the station again, are used for determining the distance of the object from the station. This arrangement is not essential to the invention, however. Where such an arrangement is used, however, I associate with the apparatus thus far described some suitable means for producing these ultra-violet rays, and as one convenient means I have shown an arc lamp 30 which is mounted on the shaft 21 and in which are used carbons impregnated with magnesium or some other suitable substance which when burned will produce strong ultra-violet rays. This lamp is shown as mounted within a parabolic reflector 31, the front of which is closed by a lens 32, preferably of quartz or some other material which will transmit the ultra-violet rays.

Since the lamp 30 is mounted on the shaft 21 it will rotate therewith, and as a result flashes of ultra-violet rays will be transmitted in different directions.

To illustrate the operation of the device let us assume that there are two boats A and B at sea equipped with my apparatus as above described. When boat B comes within range of the ultra-violet rays emanating from boat A some of said rays from boat A will pass into that receiver 1 on boat B which is directed toward boat A. As soon as this occurs, the resistance between the terminals 2 and 3 in said receiver is reduced sufficiently to permit the current to flow in the corresponding circuit 4 thereby lighting the corresponding lamp 6 so that by observing which lamp 6 is lighted the direction of boat A from boat B can be determined. The establishing of the current in the circuit 4 will open the shutter 11 of the corresponding lens or receiver 9, as above described. The ultra-violet rays which emanate from the lamp 30 on boat B strike a suitable reflector 35 carried by boat A and are reflected thereby back to boat B, these reflected rays entering the open shutter 11, passing through the lens 9 to the mirror 14 from which they are reflected on to the indicator 15.

It is my intention to rotate the shaft 21 and the lamp 30 and the mirror 14 carried thereby extremely rapidly, say at a speed of thirty thousand revolutions per minute, which will result in thirty thousand flashes of ultra-violet rays per minute being sent in the direction of boat A from boat B. Each flash is sent to boat A when the lamp points directly toward said boat, and in this position the mirror 14 faces the lens 9. Each flash will be reflected by the reflector 35 on boat A back to the mirror 14, as above described, but during the time that it has taken for the light to travel from boat B to boat A and back again the shaft 21 will have turned through a slight angle, the degree of which will depend upon the distance between the two boats, said shaft obviously having time to turn through a larger angle if the boats are ten miles apart than it would have if the boats were only five miles apart. As a result the ray of light reflected from the mirror 14 will not be reflected on to the scale 15 directly above the lens 9, but to one side thereof a distance dependent upon the distance between the two boats. Wherever the ray reflected from the mirror 14 strikes the scale 15 it will cause a current to flow in one of the circuits 17 by reducing the resistance of the corresponding selenium cell and therefore one of the lamps 18 will be lighted. The lighted lamp 6 will indicate to the observer which of the lenses 9 is open and will give the zero point for the calculations necessary to determine the distance, and by using the lighted lamp 6 as a zero point, the distance of the boat A can be readily calculated by noting the relation between the lighted lamp 6 and the lighted lamp 18. Of course, in order to readily read this distance a table would have to be prepared giving the proper relationship between each of the lamps 6 when used as a zero point and each one of the lamps 18, so that by referring to this prepared table the distance of the boat A can be instantly read by noting which of the lamps 6 and 18 are lighted.

The reflector 35 which is used for reflecting the ultra-violet rays from boat A may be of any suitable shape and may be situated at any desired point on the ship.

I have herein shown a multi-sided reflector situated directly back of the lamp 30 and extending above the same, the reflecting surfaces of which may be mirrors, polished metal or of any other suitable character adapted to reflect ultra-violet rays.

The receivers 1 may be all arranged in the same horizontal plane, as shown in Figs. 1 and 2. I prefer however to arrange the lenses or receivers 9 in different horizontal planes, because by this means I am better enabled to make the signal non-interfering. Figs. 1 and 2 show one arrangement of the lenses 9.

In practice I prefer to arrange the selenium cells 16 in groups, there being one group for each of the lenses 9, and in Fig. 2 I have illustrated diagrammatically the groups of selenium cells.

The number of selenium cells in each group may be varied without departing from the invention. The greater the number of cells and the greater the number of circuits 17 and lamps 18 in each group the greater will be the sensitiveness and range of the apparatus.

Each group of selenium cells will have to have its proper position with relation to the corresponding lens 9, so that a beam of light rays transmitted through said lens 9 onto the mirror 14, will be reflected onto the selenium cells of the group corresponding to said lens 9.

By placing the lenses 9 in different horizontal planes and similarly arranging the groups of selenium cells 16 it will not be possible for any beam of rays transmitted through one lens 9 to be reflected onto the selenium cells corresponding to another lens 9, and in this way the reading of the instrument may be simplified.

Preferably the lamps 6 and 18 will be placed in the pilot house or any other convenient place where they can be observed by the proper persons.

The lenses 9 and the receivers 1, together with the selenium cells may be placed in any convenient position on the boat, and I have herein illustrated them as contained within a housing 40 situated above the pilot house 41.

From the above description it will be seen that the reflector 35 must be always positioned to reflect any ray of light striking it back in the same direction from which the ray came.

It is also preferable to employ a reflector with flat sides in order that it may not disperse the rays striking it. Accordingly I make the reflector 35 flat-sided, as shown, and mount it on a shaft 60 which is rotated at a proper speed, each rotation of the shaft changing the angular position of the reflecting faces of the reflector.

Any suitable means for rotating the shafts 21 and 60 may be employed, and I have herein shown a synchronous motor 61 the shaft of which is geared to the shafts 21 and 60.

It will be understood of course that any suitable means may be employed for rotating the shaft 21 at the proper speed, and similarly any suitable means may be employed for rotating the shaft 60.

My apparatus may be used on other objects than boats, and when used on land the different elements of the apparatus will be placed in any suitable or convenient position.

I have not attempted to illustrate herein all forms in which the invention may be embodied, but have selected one embodiment only to illustrate the invention.

Since I believe that I am the first to provide a signal system adapted automatically to indicate visually both the distance and direction of one object from another by means of energy which is transmitted in transverse waves I desire to claim this broadly and do not limit my invention to the precise apparatus shown.

Having described my invention what I claim as new and desire to secure by Letters Patent is:—

1. An apparatus for determining distance between two points comprising means for projecting energy in the form of waves from one of said points, means at the other point for reflecting said waves, and distance-indicating means sensitive to said waves and in position to receive the reflected waves.

2. An apparatus for determining distance between two points comprising means for projecting energy in the form of waves from one of said points, means at the other point for reflecting said waves, and electrical distance-indicating means sensitive to said waves and in position to receive the reflected waves.

3. An apparatus for determining distance between two points comprising means for projecting energy in the form of waves from one of said points, means at the other point for reflecting said waves, and distance-indicating means adapted to visually indicate the distance between the points, said means being sensitive to said waves and in position to receive the reflected waves.

4. The combination with direction-indicating means for indicating the direction of one object from another, of distance-indicating means for indicating the distance between said objects, and means for rendering said distance-indicating means operative by the direction-indicating means.

5. In a signal device the combination with means to produce ultra-violet light rays and means to project said rays onto a distant object, of means to indicate by the ultra-violet rays reflected from said object the distance of the object from the light-producing means.

6. In a signaling system, means to produce ultra-violet light rays at two separated points, means rendered operative by the ultra-violet rays generated at one point to indicate the direction of one point from the other, and means at the other point and rendered operative by the ultra-violet rays produced at said latter point to indicate the distance between said points.

7. A range-finding apparatus comprising means to produce energy in the form of transverse waves at two separated points, means rendered operative by the waves generated at one point to indicate the direction of one point from the other, and means at the other point and rendered operative by the waves produced at said latter point to indicate the distance between said points.

8. A range-finding apparatus comprising means to produce energy in the form of transverse waves at two separated points, means rendered operative by the waves generated at one point to indicate the direction of one point from the other, and means at the other point and rendered operative by the waves produced at said latter point to indicate visually the distance between said points.

9. An apparatus for determining the distance between two points comprising means for projecting energy in the form of transverse waves from one of said points, means at the other point for reflecting said waves, and distance-indicating means sensitive to said waves and in position to receive the reflected waves.

10. An apparatus for determining the distance between two points, comprising means for projecting energy in the form of transverse waves from one of said points, means at the other point for reflecting said waves, and electrical distance-indicating means sensitive to said waves and in position to receive the reflected waves.

11. An apparatus for determining the distance between two points comprising means for projecting energy in the form of transverse waves from one of said points, means at the other point for reflecting said waves, and distance-indicating means to indicate visually the distance between said points, said means being sensitive to said waves and in position to receive the reflected waves.

12. A distance-indicating apparatus comprising means for projecting light rays, means for reflecting said rays, and distance-indicating means sensitive to said rays and positioned to receive the reflected rays.

13. A distance-indicating apparatus comprising means for projecting ultra-violet light rays, means for reflecting said rays from a point the distance of which is to be determined, and distance-indicating means sensitive to said rays and positioned to receive the reflected rays.

14. A device of the class described, comprising means to generate and project ultra-violet light rays, a revolving reflector to receive and reflect said rays, and distance-indicating means sensitive to said rays and positioned to receive the reflected rays.

15. A device of the class described comprising means to generate and project ultra-violet light rays, a revolving reflector to receive and reflect said rays, and distance-indicating means to indicate visually the distance which the rays are reflected, said distance-indicating means being sensitive to said rays and positioned to receive the reflected rays.

16. A device of the class described comprising means to generate and project ultra-violet light rays, a revolving reflector to receive and reflect said rays, and distance-indicating means to indicate the distance which the rays are reflected, said means including an electrical indicator and means for operating the indicator, said means being sensitive to said rays and positioned to receive them.

17. In a device of the class described, means to project ultra-violet light rays, means to reflect said rays, and an electrical indicator to indicate the time taken for the rays to travel from the point of projection to the reflector and back to said indicator.

18. In a device of the class described, means to project ultra-violet light rays, means to reflect said rays, and indicating means including a normally open circuit and means to close said circuit by the action of the reflected rays.

19. In a device of the class described, means to project ultra-violet light rays, means to reflect said rays, and indicating means including a plurality of normally open circuits and means in each circuit to close the latter by the action of said reflected rays.

20. In a device of the class described, means to project energy in the form of waves, and means to indicate visually the direction from which said waves come, said means being sensitive to said waves and adapted to receive waves projected from any direction.

21. In a device of the class described, means to project energy in the form of transverse waves, and visual direction-indicating means sensitive to said waves and positioned to receive them when projected from a plurality of directions.

22. In a device of the class described, means to project energy in the form of transverse waves, and direction-indicating means sensitive to said waves and positioned to receive them when projected from anyone of a plurality of directions and provided with means to indicate visually the direction from which the waves come.

23. In a device of the class described, the combination with a plurality of circuits each having a resistance therein which is varied by light rays, of movable light-receiving means to direct light rays onto the resistance in one of said circuits.

24. In a device of the class described, the combination with a plurality of open circuits, of means to receive transverse waves projected from a distant point, and means to close one or another of said circuits depending on the distance of said point by the action of the received waves.

25. In a device of the class described, the combination with a plurality of normally open circuits, of means rendered operative by waves projected from a distant point to close one or another of said circuits depending on the distance of said point.

26. In a device of the class described, the combination with a plurality of normally open circuits, each corresponding to a certain distance, of means to receive transverse waves projected from a distant point, and means to close that circuit which corresponds to the distance between said point and the receiving means by the action of the waves received by said receiving means.

27. In a device of the class described, the combination with a plurality of open circuits each corresponding to a definite distance, of means to receive light rays projected from a distant point, and means to close that circuit corresponding to the distance between said receiving means and said point by the action of the received rays.

28. In a device of the class described, the combination with a plurality of receivers each arranged to receive waves projected in a particular direction, and means to indicate visually when waves thus projected have been received by any receiver.

29. In a device of the class described, the combination with a plurality of receivers each arranged to receive waves projected in a particular direction, and means to indicate visually when such projected waves have been received by any receiver, of means to indicate automatically the distance between said receiver and the point from which the waves are projected.

30. In a device of the class described, the combination with means to project waves, of a plurality of wave-receiving devices each arranged to receive waves from one direction only, means to indicate when waves have been received by each receiver, and means to indicate simultaneously the distance from the projecting means to the receiver.

31. An apparatus for determining the distance between one point and a distant point and the direction of said distant point from the first-named point comprising means for projecting ultra-violet rays from said first-named point, means rendered operative by ultra-violet light rays projected from the distant point to indicate the direction of said distant point from the first-named point, and other means at said first-named point and rendered operative by ultra-violet light rays projected from said first-named point and reflected from the distant point to indicate the distance between said points.

32. An apparatus for determining the distance and the direction of one point from the other comprising means for projecting waves at each point, means at one point and rendered operative by waves projected from said point and reflected from the other point to indicate the distance between said points, and means at one point and rendered operative by waves projected from the other point to indicate the direction of the latter point from the former point.

In testimony whereof, I have signed my name to this specification, in the presence of two subscribing witnesses.

PERCY W. FULLER.

Witnesses:
Louis C. Smith,
Margaret A. Dunn.